(12) United States Patent
D'Amico et al.

(10) Patent No.: US 8,876,967 B2
(45) Date of Patent: Nov. 4, 2014

(54) CEMENT KILN DUST TREATMENT SYSTEM AND METHOD

(75) Inventors: Peter D'Amico, Newton, CT (US); Christopher Poling, Bel Air, MD (US); Thomas Lesniak, Clifton Park, NY (US)

(73) Assignee: Mercutek LLC, Newtown, CT (US)

( * ) Notice: Subject to any disclaimer, the term of this patent is extended or adjusted under 35 U.S.C. 154(b) by 0 days.

(21) Appl. No.: 13/512,125

(22) PCT Filed: Aug. 18, 2011

(86) PCT No.: PCT/US2011/048288
§ 371 (c)(1),
(2), (4) Date: May 25, 2012

(87) PCT Pub. No.: WO2012/024511
PCT Pub. Date: Feb. 23, 2012

(65) Prior Publication Data
US 2012/0272872 A1    Nov. 1, 2012

Related U.S. Application Data

(60) Provisional application No. 61/374,745, filed on Aug. 18, 2010.

(51) Int. Cl.
*A62D 3/30* (2007.01)
*A62D 3/36* (2007.01)
*B01D 53/64* (2006.01)
*B01D 53/74* (2006.01)
*B01D 53/77* (2006.01)
*C04B 7/43* (2006.01)

(52) U.S. Cl.
CPC ........ *B01D 53/64* (2013.01); *B01D 2258/0233* (2013.01); *B01D 2251/402* (2013.01); *B01D 2251/404* (2013.01); *B01D 2257/602* (2013.01); *C04B 7/436* (2013.01); *Y10S 588/90* (2013.01)

USPC .......... 106/640; 106/761; 106/819; 422/187; 422/168; 423/210; 588/313; 588/400; 588/404; 588/900

(58) Field of Classification Search
USPC .................. 106/640, 761, 819; 422/187, 168; 423/210; 588/313, 400, 404, 900
See application file for complete search history.

(56) References Cited

U.S. PATENT DOCUMENTS 4,844,815 A    7/1989  Ader et al.
5,219,544 A    6/1993  Kupper et al.
(Continued)

FOREIGN PATENT DOCUMENTS

DE    3840858    9/1989
EP    1649922    4/2006
(Continued)

OTHER PUBLICATIONS

Gossman, "Alternatives to ACI," International Cement Revise, May 2011.
(Continued)

*Primary Examiner* — Timothy Vanoy
(74) *Attorney, Agent, or Firm* — Akerman LLP; Richard P. Gilly; Ryan L. Harding

(57) ABSTRACT

A method for treating cement kiln dust is provided. The method includes the steps of receiving cement kiln dust (CKD) from a kiln; heating the collected CKD; forming a gas stream of vaporized metal and CKD by sufficient heating to separate at least one heavy metal from the collected CKD stream to create a cleaned CKD stream and a metal stream; providing a water soluble alkaline-earth metal polysulfide; combining the heavy metal stream with the water soluble alkaline-earth metal sulfide to create a combined stream; and removing at least a portion of one heavy metal from the combined stream.

19 Claims, 1 Drawing Sheet

(56) References Cited

U.S. PATENT DOCUMENTS

| | | | |
|---|---|---|---|
| 6,838,504 | B1 | 1/2005 | Webster et al. |
| 6,942,840 | B1 | 9/2005 | Broderick |
| 7,407,602 | B2 | 8/2008 | Hurley |
| 7,771,683 | B2 | 8/2010 | Hurley |
| 7,776,294 | B2 | 8/2010 | Hurley |
| 2004/0122277 | A1 | 6/2004 | Heller et al. |
| 2005/0244319 | A1 | 11/2005 | Hurley |
| 2006/0094920 | A1 | 5/2006 | Roper |
| 2007/0092418 | A1 | 4/2007 | Mauldin et al. |
| 2009/0193968 | A1 | 8/2009 | Jepsen et al. |
| 2009/0202407 | A1 | 8/2009 | Hurley |
| 2009/0202424 | A1* | 8/2009 | Roper, Jr. .................. 423/562 |
| 2009/0283016 | A1 | 11/2009 | Mohamed et al. |
| 2010/0000406 | A1 | 1/2010 | Schwab et al. |
| 2010/0068109 | A1 | 3/2010 | Comrie |

FOREIGN PATENT DOCUMENTS

| | | | |
|---|---|---|---|
| EP | 1842836 | 10/2007 | |
| EP | 1923366 | 5/2008 | |
| JP | H04176322 | 6/1992 | |
| JP | 2002-355531 | 12/2002 | |
| JP | 2003-192407 | 7/2003 | |
| JP | 2010-137163 A * | 6/2010 | ............ B01D 53/34 |
| WO | 2012/003423 | 1/2012 | |

OTHER PUBLICATIONS

Gossman, "Precalciner Cement Kiln Mercury (Hg) Emissions Control," GCI Tech Notes, Feb. 2007.

Hurley, "Evaluation of the CyCurex Reagent System for the Removal of Mercury from Coal Combustion Gases, carried out at the Southern Research Institute," Cylenchar Limited, Jun. 16, 2010, pp. 1-35.

Hurley, "CyCurex A revolution in Clean Air Technology," Cylenchar Limited, 2009, pp. 1-4.

"Final Program," The Joint Conference: International Thermal Treatment Technology (IT3) & Hazardous Waste Combustors (HCW) May 18, 2009, pp. 1-16.

Nowak, et al., E-mail dated Jun. 16, 2010 to among others the inventors of the application.

Transcripts of the evidentiary hearings in the London Court of International Arbitration, Day 1, Jun. 18 2012.

Hurley et al., "Agreement between Cylenchar Limited and EES," dated Apr. 9, 2010.

CyCurex® flyer, Mar. 2009.

* cited by examiner

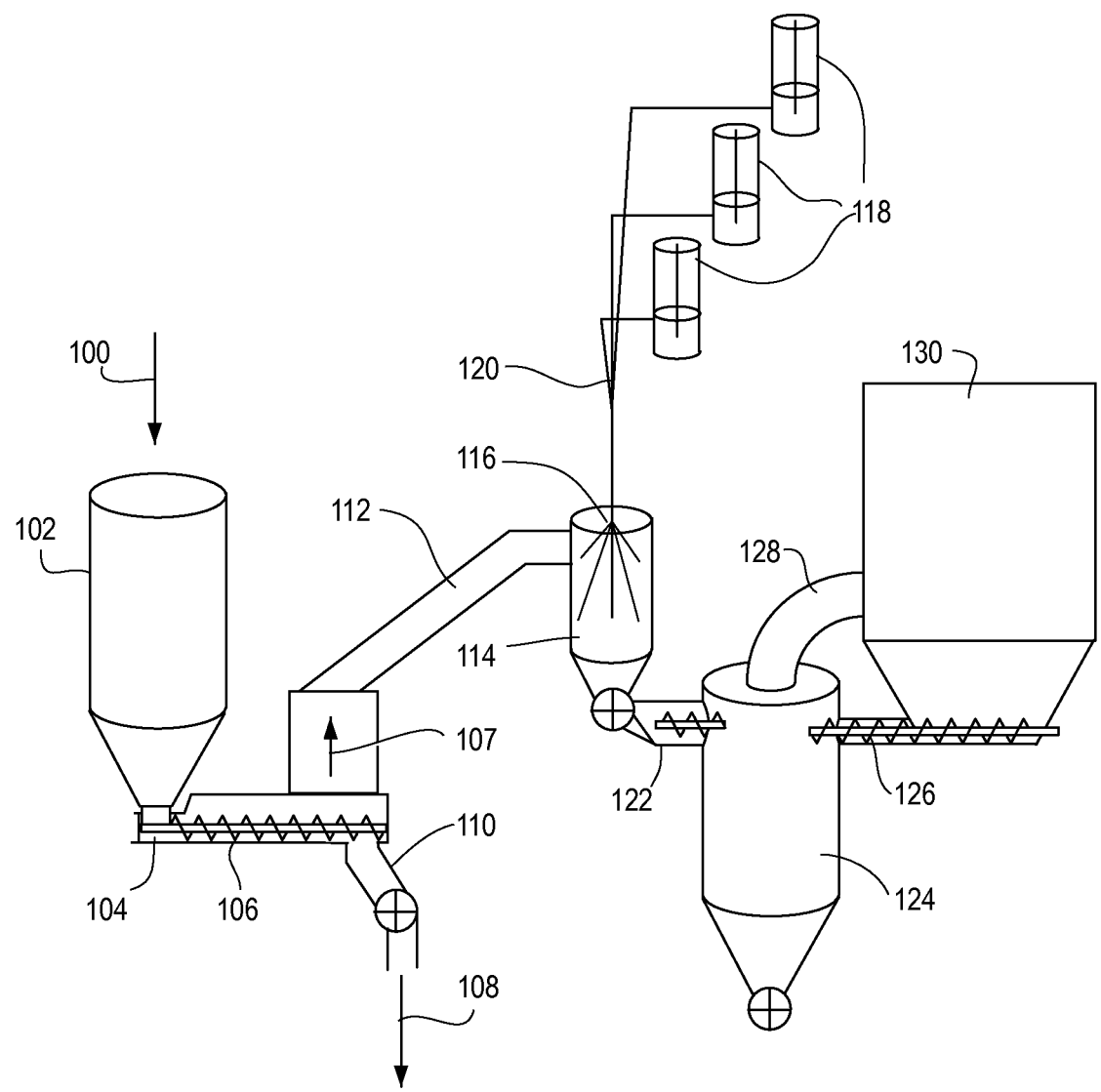

CEMENT KILN DUST TREATMENT SYSTEM AND METHOD

CROSS REFERENCES TO RELATED APPLICATIONS

This application claims the benefit of U.S. Provisional Patent Application Ser. No. 61/374,745, filed on Aug. 18, 2010, the contents of which are incorporated herein by reference in their entirety.

FIELD

The present disclosure relates to heavy-metal pollution reduction in the cement kiln environment.

BACKGROUND

Cement kiln dust (CKD) is generated by cement kilns worldwide. For example, CKD is generated in cement kilns during the production of cement clinker. Generally, CKD is a particulate mixture, including, amongst its constituents, partially calcined and unreacted raw feed, clinker dust and ash, enriched with alkali sulfates, halides, trace metals and other volatiles.

CKD varies significantly dependent upon the specific plant process and raw materials. For reference purposes a CKD composition as reported by the Bureau of Mines* includes:

| Constituent | % by Weight |
|---|---|
| $CaCO_3$ | 55.5% |
| $SiO_2$ | 13.6% |
| CaO | 8.1% |
| $K_2SO_4$ | 5.9% |
| $CaSO_4$ | 5.2% |
| $Al_2O_3$ | 4.5% |
| $Fe_2O_3$ | 2.1% |
| KCl | 1.4% |
| MgO | 1.3% |
| $Na_2SO_4$ | 1.3% |
| KF | 0.4% |
| Others | 0.7% |

* Typical Composition of Cement Kiln Dust (Haynes and Kramer, 1982)

CKD may be captured in a particulate collection system such as a baghouse or electrostatic precipitator. The captured CKD may then be utilized in a number of manners. For example, the captured CKD may be placed back into the kiln process as a raw material; placed into the cement milling process as a process addition; sold as a cementitious material; and/or sent to a landfill.

The properties and composition of CKD can be significantly affected by the design or operation of, or the materials used in, a cement kiln, with the result that constituent chemical and physical characteristics of CKD must be evaluated on an individual plant basis. In general, the alkaline nature of the CKD makes it a good neutralizing agent when adsorbing metals.

The CKD which is returned to the kiln on a routine basis undergoes a clinkering and/or calcination process, which causes compounds and trace elements to be volatilized. These materials are released back into the kiln gas stream. Over time, this often creates a cycle within the kiln gas stream, building up concentrations of the elements and compounds in the CKD which do not readily combine into clinker. As a result of the cement manufacturing process, materials such as mercury and other heavy metals may continue building in concentration. A portion of these elements may be removed from the gas stream through the scrubbing effect of the raw mill, but only when it is in suitable operation. For example, pulverized limestone may absorb at least a portion of volatilized or other trace materials directly from the exhaust gas stream which is used for drying in a raw mill. However, when the raw mill is shut down, or when cement kiln or raw mill operations are otherwise unable to absorb sufficient amounts of elements of the exhaust gas stream, greater quantities or concentrations of these elements may be released to the atmosphere through the cement kiln exhaust stack or absorbed by the CKD. Therefore, it is often desirable to treat the CKD before it is recycled back into the system.

SUMMARY

In one possible embodiment, a method for treating cement kiln dust includes the steps of collecting cement kiln dust; heating the collected cement kiln dust to separate at least one heavy metal from the collected cement kiln dust to create a heavy metal stream; treating the heavy metal stream with a treating fluid; and removing at least a portion of the heavy metal from the heavy metal stream.

In one version, the step of heating the collected cement kiln dust may involve heating to a temperature corresponding to the volatilization point of the heavy metal to be treated. The step of heating the collected cement kiln dust may include forming a modified kiln dust stream. The cement kiln dust is "modified" or "clean" in the sense that heavy metal such as mercury has been partially or completely removed from it. In other words, in modified cement kiln dust (mCKD), the amount of mercury has been reduced by the treatment described herein from that generally present in cement kiln dust prior to treatment. The modified cement kiln dust stream may be recycled as a process addition, may be disposed of, and/or may undergo further treatment.

In still further versions, the step of treating the heavy metal stream with the treating fluid may include a treating fluid containing any of the following combinations: at least one alkaline-earth metal polysulfide, an alkaline-earth metal polysulfide and water, an alkaline-earth metal polysulfide and at least one surfactant, and/or an alkaline-earth metal polysulfide and at least one catalyst agent. Other combinations of the foregoing are also within the ambit of this disclosure, and other compositions may likewise be added to the treating fluid, depending on the application.

In other possible implementations, the heavy metal stream is treated with a treating fluid so as to form a particulate containing the heavy metal; and the particulate is collected in a particulate collection system.

In still another implementation, the step of treating the heavy metal stream with the treating fluid further includes spraying the treating fluid into the heavy metal stream. Additionally, the step of collecting the particulate containing the heavy metal may include passing the particulate containing the heavy metal through at least one residue chamber. The method may further include the step of recycling the particulate containing the heavy metal for use as a process addition, or may involve further treatment or disposal.

A system for treating cement kiln dust according to this disclosure includes a volatilization vessel; at least one heat source configured to heat a cement kiln dust stream within the volatilization vessel to form a gas stream containing at least one heavy metal; a treating chamber in communication with the volatilization vessel; a treating fluid containing at least one alkaline-earth metal polysulfide; and at least one nozzle within the treating chamber configured to spray the gas stream with the treating fluid to separate at least a portion of the heavy metal from the gas stream. The treating fluid may also include water, and/or one or more catalyst agents.

In one implementation, the system may include a metering screw within the volatilization vessel configured to move the cement kiln dust stream through the volatilization vessel. A residue chamber or a particulate collection system may be provided and configured to collect at least a portion of the heavy metal.

In one version, the source of the heat for the volatilization vessel may come from transference of the heat of a cement kiln exhaust gas stream at the plant where the system is located. In addition, or alternately, the heat source may include an electrical heating element.

These and other aspects of the invention may be understood more readily from the following description and the appended drawings.

BRIEF DESCRIPTION OF THE DRAWINGS

For the purpose of facilitating an understanding of the subject matter sought to be protected, an illustrative embodiment for treating cement kiln dust (CKD) is illustrated in the FIGURE of the accompanying drawing which is meant to be exemplary and not limiting, in which like references are intended to refer to like or corresponding parts, and in which:

FIG. 1 schematically illustrates an embodiment of a system for treating cement kiln dust (CKD).

DETAILED DESCRIPTION

While this invention is susceptible of embodiments in many different forms, there is shown in the drawings and will herein be described in detail one or more detailed embodiments of systems, methods, and apparatuses for treating cement kiln dust (CKD), however, it is to be understood that the disclosed embodiments are merely exemplary of the systems, methods, and apparatuses for treating CKD, which may be embodied in various forms. Therefore, specific functional details disclosed herein are not to be interpreted as limiting, but merely as a basis for the claims and as a representative basis for teaching one skilled in the art to variously employ the systems, methods, and apparatuses disclosed herein.

Heavy metals, such as mercury, may be managed through the systems, methods, and apparatuses of the present disclosure. These heavy metals are derived primarily from raw materials which are chemically altered during a clinker process releasing these materials into a cement kiln exhaust gas stream containing CKD. These raw materials may include calcium, silica, iron and alumina derived primarily from various forms of limestone, clay, shale, slags, sand, mill scale, iron-rich material (IRM), pumice, bauxite, recycled glass, ashes, and similar materials. For example, the cement kiln exhaust gases are typically passed from a kiln through one or more processes, ducts, mills, cyclones, particulate collection systems such as kiln bag houses, ESPs, or other particulate collection systems. When the cement kiln exhaust gas stream is passed through a kiln baghouse, electrostatic precipitator (ESP), or other particulate collection system, all or a portion of the particulates within the cement kiln exhaust gas stream may be captured or collected. The collected particulate is typically a material referred to as cement kiln dust (CKD). The CKD can then be transferred to storage for controlled metering back into a cement kiln, cement grinding mill and/or used as a filler material within a concrete batch plant, asphalt plant or landfilled as non-leachable CKD.

A system and related processes for treating and/or reducing pollution from CKD according to an illustrative embodiment is described below and shown schematically in FIG. 1. Since FIG. 1 is a schematic, it will be appreciated that the sizes, shapes, arrangements, and configurations of the system components and method steps may be varied and rest within the scope of the present disclosure. As illustrated, CKD 100 collected by one or more particulate collection systems is transferred to a storage unit, vessel, or container 102, including but not limited to a silo or other vessel, or the like. The CKD 100 may then be transferred to a volatilization vessel or zone 104, which may be in communication with or connected to the container 102. In other illustrative embodiments, the CKD 100 may be transferred directly to the volatilization vessel 104, rather than being transferred to the storage unit 102.

The volatilization vessel 104 may take a variety of forms, including but not limited to, ductwork, chambers, vessels, and the like. As illustrated in FIG. 1, the CKD 100 is transferred to and/or through the volatilization vessel 104 by a metering screw 106. However, it should be appreciated by one skilled in the art that the CKD 100 may be transferred to and/or through the volatilization vessel 104 by alternative means, including but not limited to, gravitational forces, conveyors, and/or other transferring devices or the like.

Generally, heat is added to the CKD 100 within the volatilization vessel 104 to separate out and/or volatilize mercury and/or other heavy metals to from the CKD 100. For example, mercury's boiling point is about 356.58° C. or 673.844° F., after which point mercury exists as a gas, however other mercury compounds such as mercury chloride volatilize at temperatures as low as 302° C. In an illustrative embodiment, heat is applied to the volatilization vessel 104 and/or the metering screw 106 by one or more electric heating elements to heat the CKD 100 within the volatilization vessel 104 to increase the temperature of the CKD 100.

In other illustrative embodiments, other heat sources may be used to increase the temperature of the CKD 100 within the volatilization vessel 104, including but not limited to the cement kiln exhaust gas stream, heat from the kiln, cooler, and/or other processes within the cement plant. It should be appreciated by one skilled in the art that the heat may be applied to the CKD 100 external to or internal to the volatilization vessel 104. Further, it should be appreciated by one skilled in the art that a combination of heat sources may be used in series or in parallel, for example the cement kiln exhaust gas stream may be used to partially heat the CKD 100, while one or more additional heat sources are used to increase the temperature of the CKD 100 to the point of causing the heavy metals to release from the CKD 100.

Upon heating or increasing the temperature of the CKD 100 to the volatilization point of mercury and/or other heavy metals, the mercury and/or other heavy metals should vaporize into a heavy metal stream, i.e., a gas stream containing one or more heavy metals, generally combined with air. As such, a heavy metal or gas stream 107 and a modified CKD stream 108 are formed by the heating step. Modified CKD stream 108 may be removed and/or recycled for use in other cement kiln processes via a duct 110. Duct 110 may be downstream of and connected to or in communication with the volatilization vessel 104. The gas, air, or heavy metal stream 107 containing vaporized mercury and possibly other heavy metals may then be transferred to a treatment unit or injection system through a duct 112, which may be upstream of and connected to or in communication with the volatilization vessel 104. In one possible implementation, the treatment unit includes but is not limited to, ductwork, chambers, cyclones, nozzles, and the like. As illustrated schematically in FIG. 1, the treatment unit includes a chamber or treating chamber 114 and one or more nozzles 116 suitably positioned to communicate with the chamber 114. In this illustrative embodiment, the chamber 114 is downstream of and connected to or in communication with the volatilization vessel 104 via duct 112. The nozzles 116 are connected to or in communication with one or more vessels or containers 118 for storing one or more fluids through one or more fluid connections 120, such as pipes and/or hoses. The fluids are typically stored in the vessels 118 and transported through the fluid connections 120 to the gas stream in the chamber 114. The fluids can then be sprayed or injected into one or more ducts, chambers, or other process equipment carrying the gas stream containing the vaporized mercury and/or other heavy metals to thereby treat and at least partially remove mercury and/or other heavy metals from the gas stream.

In an illustrative embodiment, the fluids or treating fluid is an aqueous spray solution. The treating fluid may be provided in a fully soluble form enabling low cost application and retrofitting of existing facilities. The treating fluid may comprise, include, consist, or consist essentially of a reagent containing an alkaline-earth metal sulfide and/or polysulfide. The alkaline-earth metal sulfide and/or polysulfide may have a pH of about 10 or more, and the treating fluid may have a pH of about 7 to 10 dependent upon the concentration of reagent in the treating fluid. In one embodiment, the reagent may contain the alkaline-earth metal sulfide and/or polysulfide typically at a concentration of about 20% to 40% in water. In another embodiment, the reagent may contain the alkaline-earth metal sulfide and/or polysulfide at higher concentrations in water, or, alternately, may be in a powder or solid form having a substantially higher percentage, or consisting entirely, of the alkaline-earth metal sulfide and/or polysulfide. The alkaline-earth metal sulfide/polysulfide may be added to another solid, powder, or liquid carrier to form the reagent.

In an illustrative embodiment, the reagent may comprise, include, consist, or consist essentially of an alkaline-earth metal polysulfide in water. The alkaline-earth metal polysulfide may be either a magnesium or calcium polysulfide, and may be present in the reagent in an amount of about 25% to 35%, or about 25% to 30% in water. In another illustrative embodiment, the alkaline-earth metal polysulfide is a mixture of magnesium polysulfides and calcium polysulfides, wherein the polysulfides are present in the reagent in an amount of about 25% to 35%, or about 25% to 30% in water.

In an illustrative embodiment, the treating fluid may comprise, include, consist, or consist essentially of the reagent and water. The treating fluid may contain the reagent and water in a ratio of about 1:1 to 1:10, in a ratio of about 1:3 to 1:6, and more particularly in a ratio of about 1:4. When the reagent contains the alkaline-earth metal sulfide and/or polysulfide at a concentration of about 20% to 40% in water, the resulting treating fluid may contain the alkaline-earth metal sulfide and/or polysulfide and water in ratios of about 1:4 to about 1:54, in a ratio of about 1:9 to 1:34, and more particularly in a ratio of about 1:11 to 1:24. Thus, the alkaline-earth metal sulfide and/or polysulfide may be present in the treating solution in an amount of about 1.8% to 11%. However, it should be appreciated by one skilled in the art that the ratios of reagent to water and/or the alkaline-earth metal sulfide and/or polysulfide to water can vary outside of the ranges listed above. In many applications, the economic goal may be to use as little of the reagent and/or the alkaline-earth metal sulfide and/or polysulfide as operationally possible. For example, the ratios used can vary dependent upon the amount of CKD, the concentration of mercury and/or other heavy metals in the gas stream, and other parameters of the type.

The reagent and water may be combined into the treating fluid prior to injecting or spraying the treating fluid into the one or more ducts, chambers, or other process equipment carrying the gas stream containing the vaporized mercury and/or other heavy metals. For example, the reagent and water may be combined well in advance of (i.e. one or more hours, days, weeks, months, etc. in advance) or just prior to (i.e. one or more minutes prior to) injecting or spraying the treating fluid into the one or more ducts, chambers, or other process equipment.

Alternatively, the reagent and water may each be separately sprayed or injected into the one or more ducts, chambers, or other process equipment carrying the gas stream containing the vaporized mercury and/or other heavy metals in a manner such that they intersect, combine, interact or coalesce in the one or more ducts, chambers, or other process equipment to form a solution or composition in situ, forming droplets of the solution or composition with the reagent reacting with the metal(s) in the gas stream for removal.

The treating fluid may also contain one or more surfactants, dispersants, and/or hyperdispersants to assist in the removal of metal(s) from the gas stream containing the vaporized mercury and/or other heavy metals. In one embodiment, the surfactant, dispersant, and/or hyperdispersant are composed of one or more polyethylene oxide-polyethylene block co-polymers and/or the phosphate esters thereof. The addition of the surfactant, dispersant, and/or hyper dispersant to the treating fluid may be optional. When the surfactant, dispersant, and/or hyper dispersant is included, the surfactant, dispersant, and/or hyper dispersant may be provided in an amount sufficient to assist in maintaining the reaction agent or reagent in the treating fluid prior to reaction with the metal(s), for example in an amount of about 1% or less. According to the latter case, the surfactant, dispersant, and/or hyper dispersant is a polyethylene oxide-polyethylene block co-polymer and the phosphate esters thereof.

The treating fluid may also contain one or more catalyst agents to assist in or accelerate the removal of metal(s) from the gas stream containing the vaporized mercury and/or other heavy metals. The one or more catalyst agents may accelerate the reaction of the reagent with the metal(s) in the gas stream, for example by releasing hydrogen sulfide from the reagent. In one embodiment, the catalyst agent is composed of calcium phosphate. However, it should be appreciated by one skilled in the art that other catalyst agents may be used. The catalyst agent may have a pH of 7 or less. However, it should be appreciated by one skilled in the art that depending on the pH of the CKD and/or the gas stream containing the vaporized mercury and/or other metal(s), the addition of the catalyst agent to the treating fluid may be optional. When the catalyst agent is included, the catalyst agent may be provided in an amount sufficient to assist in or accelerate the reaction.

In an illustrative embodiment, the treating fluid comprising, including, consisting, or consisting essentially of the reagent, water, the one or more surfactants, dispersants, and/or hyper dispersants, and/or the one or more catalyst agents may be combined into the treating fluid prior to injecting or spraying the treating fluid into the one or more ducts, chambers, or other process equipment carrying the gas stream containing the vaporized mercury and/or other heavy metals. For example, the reagent, water, the one or more surfactants, dispersants, and/or hyper dispersants, and/or the one or more catalyst agents may be combined well in advance of (i.e. one or more hours, days, weeks, months, etc. in advance) or just prior to (i.e. one or more minutes prior to) injecting or spraying the treating fluid into the one or more ducts, chambers, or other process equipment.

Referring back to FIG. 1, all or a portion of the volatilized mercury and/or other heavy metals treated with the treating fluid in the chamber 114 may precipitate or separate out of the gas stream as particulates resulting in a clean gas or air stream. The precipitate or particulates may be filtered out, such as through a residue silo and/or a particulate filter. In this regard, the collected mercury and/or other metal(s) can then be further processed, recycled or otherwise disposed of properly.

In an illustrative embodiment, the particulates and clean gas stream may be transferred through a duct 122 to a residue chamber, vessel, or silo 124. As illustrated in FIG. 1, the duct 122 is downstream of and connected to or in communication with the chamber 114, and upstream of and connected to or in communication with the residue chamber 124. The particulates are transferred to the residue chamber 124 by a metering screw 126. However, it should be appreciated by one skilled in the art that the particulates may be transferred to residue chamber 124 by alternative means, including but not limited to, gravitational forces, conveyors, and/or other transferring devices of the type. The residue chamber 124 generally collects all or a portion of the particulates from the treated gas stream. Further, the clean gas stream may be transferred through a duct 128, which may be upstream of and connected to or in communication with the residue chamber 124, to one or more particulate collection systems 130, which may be upstream of and connected to or in communication with the duct 128, to further collect all or a portion of the remaining particulates in the clean gas stream. Any particulates captured in the particulate collection system(s) 130 and/or the residue chamber 124 may be recycled, for example by returning the captured particulates to the storage unit 102, or otherwise disposed of properly. The remaining clean gas stream may then be exhausted to the atmosphere through the particulate collection system(s) 130.

In an illustrative embodiment, the system, method, and apparatus illustrated in FIG. 1 may be used to treat the CKD on a substantially continual basis to remove and capture metals from all or a portion of the CKD, reducing or eliminating buildup and concentration of mercury and/or other metals in the gas stream and particulate collection system(s) during kiln operations. Alternatively, all or a portion of the CKD may be treated on a non-continuous basis to remove mercury and other metals as their concentrations increase in the CKD. The non-continuous basis may be tailored or in response to measurements of mercury and other metals at any number of points in the kiln or other components of the cement plant, such as before or after the particulate collection system(s), or proximate to the exhaust stack. The non-continuous basis may also be triggered to run in response to any number of parameters, such as time, measurements of CKD constituents, and other parameters of the type. Each system, method, and apparatus may be tailored to each cement kiln or plant based on the actual raw materials, costs, and any number of other operational, or functional parameters.

While the systems, methods, and apparatuses have been described and illustrated in connection with certain embodiments, it should be appreciated by one skilled in the art that the particulate collection system(s) may be any of the variety of apparatus suitable for capturing, filtering, or otherwise collecting dust from the cement kiln's various operations including but not limited to a kiln baghouse, electrostatic precipitator (ESP), or other particulate collection system. Given the variety of cement kiln configurations possible, it should be appreciated by one skilled in the art that the particulate collection system, as well as the apparatus for treating the cement kiln dust, may be operatively associated with the cement kiln, i.e., capable of receiving material for treatment, at any number of suitable locations relative to the components of the cement kiln. Further, depending on the volume of residual material generated, the portion which cannot be utilized as a process addition will have to be disposed of, but this is expected to be very minor volume in the overall context.

The systems, methods, and processes disclosed herein have been identified, adapted to, and designed for the cement industry. In one form, the systems, methods, and processes disclosed herein may provide a lower capital cost, lower operating cost, and most importantly reduced mercury pollution levels. While the above description relates generally to mercury capture, it should be appreciated that the systems, methods, processes, and technology disclosed herein may be modified to capture hexavalent chromium and a variety of other metals.

The matter set forth in the foregoing description and accompanying drawings is offered by way of illustration only and not as a limitation. While the systems, methods, and apparatuses have been described and illustrated in connection with certain embodiments, many variations and modifications will be evident to those skilled in the art and may be made without departing from the spirit and scope of the disclosure. The systems, methods, and apparatuses disclosed herein are thus not to be limited to the precise details of methodology or construction set forth above as such variations and modification are intended to be included within the scope of the disclosure.

What is claimed is:

1. A method for treating cement kiln dust, comprising:
receiving cement kiln dust from a cement kiln;
heating the cement kiln dust to separate at least one heavy metal from the cement kiln dust to create a heavy metal containing gas stream;
treating the heavy metal gas stream with a treating fluid, wherein treating the gas stream with the treating fluid comprises treating the gas stream with a treating fluid containing at least one alkaline-earth metal polysulfide; and
removing at least a portion of at least one heavy metal from the gas stream.

2. The method of claim 1, wherein heating the cement kiln dust includes heating to a temperature at least as high as the temperature corresponding to the volatilization point of the heavy metal.

3. The method of claim 1, wherein heating the cement kiln dust includes forming a modified cement kiln dust stream.

4. The method of claim 3, further comprising recycling the modified cement kiln dust stream.

5. The method of claim 1, wherein heating the cement kiln dust includes heating to a temperature at least as high as the volatilization point of mercury to separate mercury from the cement kiln dust.

6. The method of claim 5, wherein the treating step includes exposing the heavy metal gas stream to the treating fluid containing the at least one alkaline-earth metal polysulfide to form a particulate containing the at least one heavy metal; the method further comprising collecting the particulate in at least one particulate collection system.

7. The method of claim 6, further comprising recycling the particulate containing the at least one metal.

8. The method of claim 6, wherein the collecting the particulate containing the at least one metal includes passing the particulate containing the at least one metal through at least one residue chamber.

9. The method of claim 6, wherein treating the heavy gas stream further includes spraying the treating fluid comprising the at least one alkaline-earth metal polysulfide into the heavy metal gas stream.

10. The method of claim 1, wherein treating the heavy metal gas stream with the treating fluid further includes treating the heavy metal gas stream with a treating fluid containing an alkaline-earth metal polysulfide and at least one of the following: water, at least one surfactant, and at least one catalyst agent.

11. The method of claim 1, wherein receiving the cement kiln dust includes collecting cement kiln dust captured in a cement kiln.

12. A system for treating cement kiln dust, comprising:
a volatilization vessel;
at least one heat source configured to heat a cement kiln dust stream within the volatilization vessel forming a gas stream containing at least one metal;
a treating chamber in communication with the volatilization vessel;
a treating fluid containing at least one alkaline-earth metal polysulfide; and
at least one nozzle within the treating chamber configured to spray the gas stream with the treating fluid separating at least a portion of the at least one metal from the gas stream.

13. The system of claim 12, further comprising a metering screw within the volatilization vessel configured to move the cement kiln dust stream through the volatilization vessel.

14. The system of claim 12, further comprising a collection system, wherein the collection system further includes a residue chamber configured to collect at least a portion of the at least one metal.

15. The system of claim 12, further comprising a collection system, wherein the collection system further includes a particulate collection system configured to collect at least a portion of the at least one metal.

16. The system of claim 12, wherein the at least one heat source further includes a cement kiln exhaust gas stream.

17. The system of claim 12, wherein the at least one heat source further includes an electrical heating element.

18. A method for removing mercury from cement kiln dust, comprising:
collecting cement kiln dust from a cement kiln;
heating the collected cement kiln dust to a temperature at least as high as the volatilization point of mercury to form a stream of volatilized mercury and a stream of modified cement kiln dust;
separating the stream of modified cement kiln dust for further use;
treating the stream of volatized mercury with a treating fluid containing at least one alkaline-earth metal polysulfide to form a particulate containing the mercury; and
collecting the particulate for subsequent handling.

19. The method of claim 18, wherein the modified cement kiln dust is recycled into a cement mill.

* * * * *